United States Patent [19]

Henderson

[11] Patent Number: 5,686,546
[45] Date of Patent: Nov. 11, 1997

[54] CROSS-LINKABLE POLYMER COMPOSITION CONTAINING A CARBOXYLIC ACID PRECURSOR AS A CATALYST

[75] Inventor: Alexander Henderson, Brampton, Canada

[73] Assignee: At Plastics, Inc., Ontario, Canada

[21] Appl. No.: 552,489

[22] Filed: Nov. 9, 1995

[30] Foreign Application Priority Data

Nov. 15, 1994 [CA] Canada ................... 2135846

[51] Int. Cl.6 ................................. C08G 77/08
[52] U.S. Cl. ..................... 528/12; 528/15; 528/18; 528/19; 526/279; 428/447; 427/387
[58] Field of Search ................. 526/229; 428/447; 528/12, 15, 18, 19; 427/387

[56] References Cited

U.S. PATENT DOCUMENTS

| | | |
|---|---|---|
| 3,225,018 | 12/1965 | Zutty . |
| 3,392,156 | 7/1968 | Donaldson . |
| 3,859,247 | 1/1975 | Mackenzie, Jr. . |
| 3,946,099 | 3/1976 | Mackenzie, Jr. . |
| 3,957,719 | 5/1976 | Mackenzie, Jr. . |
| 4,117,063 | 9/1978 | Voight et al. . |
| 4,117,195 | 9/1978 | Swarbrick et al. . |
| 4,153,765 | 5/1979 | Tsai . |
| 4,297,310 | 10/1981 | Akutsu et al. . |
| 5,047,476 | 9/1991 | Keogh ..................... 525/474 |

FOREIGN PATENT DOCUMENTS

| | | |
|---|---|---|
| 401 540 | 12/1990 | European Pat. Off. . |
| 1 372 453 | 10/1974 | United Kingdom . |
| 1 415 194 | 11/1975 | United Kingdom . |
| 91 09075 | 6/1991 | WIPO . |

*Primary Examiner*—Melvn I. Marquis
*Attorney, Agent, or Firm*—Cushman, Darby & Cushman Intellectual Property Group of Pillsbury Madison & Sutro LLP

[57] ABSTRACT

A cross-linkable polymer composition containing a cross-linkable polymer having at least one hydrolysable silane group and at least one lactone or anhydride silanol condensation catalyst for example, lactide and 2-dodecen-1-yl succinic anhydride. The catalyst is not conducive to causing premature cross-linking. The composition provides a cross-linked polymer having good anti-scorch properties. Compositions containing lactones as the silanol condensation catalyst also provide cross-linked polymers having improved adhesion properties.

23 Claims, No Drawings

CROSS-LINKABLE POLYMER COMPOSITION CONTAINING A CARBOXYLIC ACID PRECURSOR AS A CATALYST

FIELD OF THE INVENTION

This invention relates to a cross-linkable polymer composition comprising a cross-linkable polymer having hydrolysable silane groups and a silanol condensation catalyst, processes for cross-linking said polymer, cross-linked polymers produced thereby and substrates coated with said cross-linked polymers.

BACKGROUND TO THE INVENTION

Polyolefins containing silane groups on the polymer backbone are well known, for example, U.S. Pat. No. 4,689,369, issued Aug. 25, 1987, to Mitsubishi Petrochemical Co. Ltd. Such silane cross-linked polymer products are of industrial and commercial value in being extensively used in various fields, such as electric power cables, pipes, tubes, films, sheets, hollow moldings and foamed moldings.

These polymers crosslink upon exposure to moisture in the presence of silanol condensation catalysts. Desired levels of crosslinking, as measured by % Gel (ASTM D2765) typically have % Gel >50 w/w %, preferably >65% w/w. Typical silanol condensation catalysts known in the prior art include organometallic basic compounds, particularly solids such as oligomeric dialkyltin maleate and liquids such as dibutyltin dilaurate; and acidic compounds such as carboxylic acids.

However, in processing a mixture of silane condensation catalyst and the ethylene copolymer obtained by radical polymerization of ethylene and unsaturated silane compounds, premature state condensation reaction may occur, for example, at the initial stage in an extruder during extrusion processing and unevenness tends to occur on the surface of an extrudate. This defect is termed "scorching" and deteriorates the commercial value of the product and improvement thereof is highly sought. The premature cross-linking scorch problem is a widely recognized one of these moisture cross-linkable compositions due to premature cross-linking as witnessed by the number of patents claiming to reduce it. One way to minimize "scorch" is to use retarders as is described in, for example EP 0,193,317, which scavenge water and minimize the chances of premature cross-linking during processing. EP Application 0,401,540 to Union Carbide Chemicals & Plastics Company, Inc. published Dec. 12, 1990, describes a process of minimizing scorch by mixing in the processing zone at least one hydrolysable silane moiety, a dihydrocarbyltin oxide and a carboxylic acid or species capable of forming a carboxylic acid when subjected to heat or moisture.

International Patent Application WO 91/09075 to Neste Oy, published Jun. 27, 1991, describes a composition consisting of silane polymer and a silanol condensation catalyst consisting of an acid anhydride in order to minimize premature cross-linking.

However, industry is constantly searching for compositions which minimize premature cross-linking and provide improved properties to the finished article.

Polymeric coatings are often applied to metallic substrates, such as the surface of steel storage tanks to minimize oxidation. It is generally further desired to cross-link the lining to extend its lifetime to reduce stress crack failure and increase the time to embrittlement. One process used to line metallic tanks is rotomolding whereby the tank containing powdered polymer is rotated around a variety of axes in a heated zone to melt the powder and line the metal tank. It is desirable that the lining maintain good adhesion to the metal. If "disbonding" occurs, that is, the cross-linked polymer plastic separates from the metal and is no longer held in intimate contact, then air or water may permeate through the polymer and increase and fill the "gap" between substrate and polymer lining to, thus, increase the chances of corrosion and reduce the effectiveness of the lining. For cross-linked linings, which are susceptible to "scorch" during processing, it is desirable that there be no gels which could act as "stress raisors" leading to stress cracking.

SUMMARY OF THE INVENTION

Surprisingly, I have discovered a composition which does not undergo unwanted premature cross-linking, but which also possesses good adhesion to a substrate.

It is an object of the present invention to provide a cross-linkable silane polymer composition having improved premature cross-linking properties.

It is a further object of the invention to provide a cross-linked silane polymer composition having improved adhesion properties.

It is a yet further object of the invention to provide a process of manufacturing a cross-linked silane polymer composition having improved properties.

Accordingly, the invention provides in its broadest aspect a cross-linkable polymer composition containing a cross-linkable polymer having at least one hydrolysable silane group and at least one silanol condensation catalyst wherein said silanol condensation catalyst is a compound having a lactone moiety or an anhydride moiety.

The term "polymer" in this specification and claims includes copolymers. By the term "lactone moiety" is meant a compound having at least one lactone group. By the term "anhydride moiety" is meant a compound having at least one anhydride group. Although in this specification and claims the lactone or anhydride moiety containing compound is referred to as the silanol condensation catalyst it would be well recognized that these compounds, in fact, are precursors to the actual carboxylic acid catalytic agents produced therefrom when desired by hydrolysis of the lactone or anhydride in situ in the composition.

Preferably, the lactone is part of a five (gamma-) or six-(delta) membered cyclic group constituting a monolactone or, more preferably, a dilactone six-membered ring. Most preferred catalyst compounds of use in the practice of the invention are dilactones of the general 1,4-dioxane-2,5-dione formula:

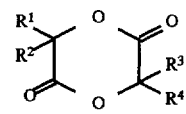

wherein $R^1$, $R^2$, $R^3$ and $R^4$ are selected from hydrogen and $C_1$–$C_4$ alkyl groups, particularly $CH_3$ groups. Specific compounds of value in the invention are $R^1=R^3=H$ and $R^2=R^4=CH_3$ (the lactide 3,6-dimethyl-1,4-dioxane-2,5-dione) and $R^1=R^2=R^3=R^4=H$ (the glycolide 1,4-dioxane-2,5-dione).

The lactone catalyst may further comprise at least one hydroxyl group such as a glyconolactone, for example, delta-gluconolactone and the hydroxyl enol lactone-ascorbic acid.

The lactone and anhydride moiety catalysts of use in the invention have found particular use in the coating of metal electrical conductor wire and metal storage vessels, such as steel tanks made by known rotomolding processes to form a plastic lining thereon.

Surprisingly, I have found that rotomolding tank linings with silane polymer containing the anhydride and/or lactone moiety compounds as silanol condensation catalysts yields a lining with improved properties over the prior art catalysts. The linings containing these catalysts are smooth and gel free. Linings containing the prior art catalysts were very rough due to "scorch" and the production of gels.

Surprisingly, I have also found that rotomolding tank linings with silane polymer containing the lactone moiety compounds as silanol condensation catalysts yields a lining with improved properties over the prior art catalysts. The linings containing these lactone catalysts remain adhered to a steel tank in a manner favourably comparable to silane polymer without catalyst, while linings containing the prior art catalysts "disbonded" from the metal in a matter of minutes after rotomolding.

While not being bound by theory, I believe that the lactone-type catalysts of use in this invention not only cause less "scorch" than the prior art catalysts but also less viscosity hardening as a precursor to "scorch". This allows the silane polymer to "wet out" the metal substrate in a manner most resembling the uncatalyzed polymer.

The use of these carboxylic acid precursor catalysts is particularly useful when the tanks are intended for storage of water, particularly hot water, which will ensure crosslinking.

Another advantage of the lactone moiety containing catalysts is that they are generally derived from naturally occurring substances and produce acids which are non-toxic and in some cases are part of the human metabolic cycle. Also, unlike most acid anhydrides, these catalysts do not have sharp, disagreeable odors.

Thus, the invention provides in a further aspect, a process for producing a cross-linked polymer said process comprising treating a composition as hereinabove defined under cross-linking conditions in a cross-linking zone to produce said cross-linked polymer, which process is enhanced by the application of an effective amount of heat and/or moisture.

The processes of the invention may be carried out using well-known prior art methods for the coating of wire and rotomolding of containers. The processing zone can be a conventional extruder, e.g. a single screw type. A typical extruder has a hopper at its upstream end and a die at its downstream end. The hopper feeds into a barrel, which contains a screw. At the downstream end between the end of the screw and the die, is a screen pack and a breaker plate. The screw portion of the extruder is considered to be divided up into three sections, the feed section, the compression section, and the metering section, and two zones, the back heat zone and the front heat zone, the sections and zones running from upstream to downstream. If it has more than one barrel, the barrels are connected in series. The length to diameter ratio of each barrel is in the range of about 16:1 to about 30:1.

The processing zone can also be a conventional injection molding apparatus or a rotomolding apparatus.

The conditions in the cross-linking zone are such that the lactone moiety forms a free carboxylic acid. As noted, this is accomplished through the application of heat and/or moisture. The temperature in the cross-linking zone will generally be in the range of about 20° C. to about 150° C. and is preferably in the range of about 50° C. to about 100° C. With respect to those compounds which need moisture to form the carboxylic acid, the formation is generally facilitated by the presence of heat in the ranges mentioned above. However, care must be taken that the conditions are such that the lactone moiety compound is not decomposed or otherwise destroyed.

The residence time of the mixture in the processing zone is, for example, of sufficient length to complete all or part of the extrusion, injection molding, or roto molding. This time is in the range of about 20 to about 2000 seconds and is preferably about 60 to about 1000 seconds.

The cross-linking zone is usually a water bath through which the extruded molded resin, i.e. the processed resin, is passed. The residence time in this zone can be in the range of about 0.01 to about 240 hours and is preferably about 8 to about 72 hours. As an alternative to the water bath, the zone can be humidified at a relative humidity of at least about 50 percent.

Conventional additives can be added to the mixture introduced into the processing zone. The amount of additive is usually in the range of about 0.01% w/w to about 50% w/w based on the weight of the resin. Useful additives are antioxidants, ultraviolet absorbers, antistatic agents, pigments, dyes, fillers, slip agents, fire retardants, plasticizers, processing aids, lubricants, stabilizers, and smoke inhibitors. Blends of the hydrolyzable polymer and other polymers can be prepared in the processing zone provided that the resins to be blended with the hydrolyzable copolymer will not cross-link. Examples of these resins are low density polyethylene, high density polyethylene, polypropylene, linear low density polyethylene, and very low density polyethylene (equal to or less than 0.915 grams per cubic centimeter).

In a yet further aspect, the invention provides a substrate such as an electrical conductor wire or container having a surface coated with a cross-linked polymer according to the invention.

Preferred cross-linkable polymers of use in the invention are previously known and described and prepared for example, in aforesaid USP 4689369—which is incorporated herein by reference. Thus, the preferred cross-linkable polymers having a hydrolysable silane group of use in the invention are silane grafted homopolymers or copolymers or copolymers of olefins and a silane. Preferred compositions comprise 100 parts by weight of a copolymer prepared by radically polymerizing a polymerizable monomeric mixture consisting essentially of ethylene and at least one ethylenically unsaturated silane compound selected from the group consisting of vinyltrimethoxysilane, vinyltriethoxysilane and methacryloxypropyltrimethoxysilane under a pressure ranging from 1000 to 4000 kg/cm$^2$, and containing said silane compound in an amount of from 0.5 to 2 wt. %; from 0,001 to 10 parts by weight of said silanol condensation catalyst; and most preferably when said ethylenically unsaturated silane compound is vinyltrimethoxysilane.

The cross-linkable polymers of the present invention may, optionally, but not preferably further contain compounds which have been conventionally used as a catalyst for accelerating dehydration condensation between silanol groups.

Examples of such silanol condensation catalysts are carboxylic acid salts of metal such as tin, zinc, iron, lead and cobalt, organic bases, inorganic acids, and organic acids. Representative examples of these silanol condensation catalysts are (1) carboxylic acids of metals such as dibutyltin dilaurate, dibutyltin diacetate, dibutyltin dioctoate, stannous acetate, stannous caprylate; (2) organic bases such as ethylamine, dibutylamine, hexylamine and pyridine; (3)

inorganic acids such as sulfuric acid and hydrochloric acid; and (4) organic acids such as toluenesulfonic acid, acetic acid, stearic acid and maleic acid.

The silanol condensation lactone or anhydride moiety catalyst is used in an amount of 0.001 to 10 parts, preferably 0.01 to 5 parts, and more preferably 0.1 to 3 parts, by weight per 100 parts by weight of the silane-crosslinkable ethylene copolymer. If the amount of the silanol condensation catalyst is less than 0.001 part by weight per 100 parts by weight of ethylene copolymer, the cross-linking reaction does not proceed sufficiently. If, on the other hand, the amount of the silanol condensation catalyst is more than 10 parts by weight per 100 parts by weight of copolymer, it may compromise physical properties.

It will be appreciated that the effective amount of lactone or anhydride catalyst depends on its molecular weight of the lactone, more precisely the number of lactone or anhydride groups per mole. Thus, a smaller amount is required of a catalyst having many lactone or anhydride groups and a low molecular weight, than of a catalyst having but few lactone or anhydride groups and a high molecular weight.

The ingredients of the invention as hereinabove defined may be prepared into the desired composition in a mixer conducted by conventional methods. The processed product is then silane-cross-linked with water for use, for example, as electric cable insulation or rotomold lining.

The inventive lactone or anhydride catalyst is preferably added to the cross-linkable polymer in the form of a master batch, i.e. mixed with a polymer, such as polyethylene. The master-batch contains a minor amount of the lactone or anhydride catalyst, generally about 1–25% by weight, preferably about 1–10% by weight.

The lactone or anhydride catalysts according to the invention are especially advantageous, since the catalysts may be added directly to the cross-linkable polymer, there being no need to first produce a master batch.

Fillers such as silicates, e.g. kaolin, talc, montmorillonite, zeolite, mica, silica, calcium silicate, asbestos, powdered glass, glass fibre, calcium carbonate, gypsum, magnesiumcarbonate, magnesiumhydroxide, carbon black and titanium oxide may be present in the composition of the invention without detracting from the efficacy thereof. The content of the inorganic filler may be up to 60% by weight, as based on the sum of the weights of the filler and the silane-containing polymer.

DESCRIPTION OF PREFERRED EMBODIMENTS OF THE INVENTION

In order that the invention may be better understood, preferred embodiments will now be described by way of example only.

Example 1

The following formulations were prepared on a Brabender Sigma Blade Mixer with 500 g capacity bowl by blending at 150° C. @ 20 rpm for 10 minutes. A 4 MI EVS copolymer was used which contained suitable antioxidants. The EVS Copolymer had approximately 2 wt % vinyltrimethoxysilane content. The EVS Copolymer is a commercially produced under high pressure, free radical copolymer of ethylene and vinyl trimethoxysilane in pellet form, maintained dry in water impermeables packaging and sold under the trademark AQUA-LINK® (AT PLASTICS INC., BRAMPTON, ONTARIO) Canada.

Lactide is 3,6-dimethyl-1,4-dioxane-2,5-dione, and glycolide is 1,4-dioxane-2,5 dione.

| Sample | Formulation |
| --- | --- |
| 1A | 100% EVS Polymer |
| 1B | 95% EVS Polymer |
|    | 5% Catalyst Masterbatch (1% Dibutyltindilaurate in LDPE) |
| 1C | 99% EVS Polymer |
|    | 1% Succinic Anhydride |
| 1D | 99% EVS Polymer |
|    | 1% 2-Dodeceny-1ylsuccinic anhydride |
| 1E | 99% EVS Polymer |
|    | 1% Lactide |
| 1F | 99% EVS Polymer |
|    | 1% Glycolide |

The compounds were pressed into 15 cm×15 cm×0.3 cm plaques using a picture frame mold in a heated press at 150° C. 5 tons pressure, for 2 minutes.

Example 2

The plaques from Example 1 were suspended in a humidity chamber at 70° C. and 95% R.H. and the % Gel formation measured over time using ASTM D2765. The results are given in Table 1.

TABLE 1

| Days in Sauna | % Gel 1A | % Gel 1B | % Gel 1C | % Gel 1D | % Gel 1E | % Gel 1F |
| --- | --- | --- | --- | --- | --- | --- |
| 0 | 3.3% | 15.2% | 10.5% | 15.5% | 1.6% | 2.4% |
| 1 | 1.2% | 69.2% | 68.4% | 67.9% | 1.2% | 1.1% |
| 7 | 1.8% | 76.9% | 72.6% | 79.3% | 66.8% | 77.0% |
| 14 | 19.0% | 81.2% | 79.1% | 85.3% | 74.5% | 69.9% |

The lactones and anhydrides effectively crosslink the silane polymer but the lactones do so at a slower rate than the prior art catalysts.

Example 3

The formulations shown in Table 2 were rotomolded in new, unused 4 liter paint cans by first tumble blending catalyst with the 4 MI EVS polymer used in Example 1 ground to less than 35 mesh, as is typical for rotomolding grades of polymer resins. Most catalysts consisted either of powdered (<35 mesh) 4 MI LDPE mixed with 20 wt % solid anhydride/lactone crystals/flakes or, in the case of the liquid anhydride, 20 wt % of liquid dispersed and coated onto the 4 MI LDPE powder. The dibutyltindilaurate was compounded into 4 MI LDPE at 1 wt % and then ground to <35 mesh. The EVS Polymer/Catalyst mixture in the paint can was loaded onto a chuck attached to an electric motor and rotomolded around one axis parallel to the sides of the can in an oven at 10 rpm, 265° C. for 10 minutes. The results of this rotomolding are given in Table 2.

TABLE 2

| ID | Sample | Overall Catalyst Level | Molding Surface Finish | Comments |
| --- | --- | --- | --- | --- |
| 2A | 100% EVS Polymer | 0% | smooth | good adhesion |
| 2B | 95% EVS Polymer 5% LDPE containing dibutyltindilaurate | 500 ppm DBTDL | rough, many gels | disbonded |

TABLE 2-continued

| ID | Sample | Overall Catalyst Level | Molding Surface Finish | Comments |
|---|---|---|---|---|
| 2C | 95% EVS Polymer 5% LDPE containing succinic anhydride | 1 wt % Succinic Anhydride | smooth | disbonded, sharp odor |
| 2D | 95% EVS Polymer 5% LDPE containing 2-dodecen-1ylsuccinic anhydride | 1 wt % 2-dodecen-1ylsuccinic anhydride | smooth | disbonded, oily bloom |
| 2E | 95% EVS Polymer 5% LDPE containing benzoic anhydride | 1 wt % Benzoic anhydride | smooth | disbonded, strong odor |
| 2F | 95% EVS Polymer 5% LDPE containing stearic anhydride | 1 wt % stearic anhydride | smooth | disbonded, waxy bloom |
| 2G | 95% EVS Polymer 5% LDPE containing lactide | 1 wt % lactide | smooth | good adhesion |
| 2H | 95% EVS Polymer 5% LDPE containing glycolide | 1 wt % glycolide | smooth | good adhesion |

In this table "disbonded" means that the polymer lining the sides of the can separated from the metal surface so that an air space was evident within minutes to several hours after the molding had cooled to room temperature. Good adhesion means that the lining and metal remained in intimate contact indefinitely.

Example 4

The rotomolded paint cans with polymeric linings were filled with water and stored in a 70° C. oven to simulate, for example, a hot water heater tank, and the % Gels measured over time. The results are given in Table 3.

TABLE 3

| Sample | Paint Can Full of H$_2$O Days in 70° C. Oven | % Gel |
|---|---|---|
| 2A | 7 Days | 20% |
|    | 14 days | 26% |
| 2B | 7 Days | 81.2% |
| 2C | 7 Days | 79.2% |
| 2D | 7 Days | 76.5% |
| 2E | 7 Days | 81.7% |
| 2F | 7 Days | 79.2% |
| 2G | 7 Days | 67% |
|    | 14 days | 70.8% |
| 2H | 7 days | 65% |
|    | 14 days | 67.3% |

The rotomolded linings containing catalyst are crosslinked.

Example 5

15 gallon tanks were rotomolded on a commercial rotomolder. The tanks were cylinders with rounded ends approximately 1 foot in diameter and 4 feet in length. The tanks were loaded with 2500 g of powdered (<35 mesh) 4 MI EVS Copolymer used in Example 3 and either 125 g or 65 g or the powdered (<35 mesh) catalysts used in Example 3. The tanks were rotated around 3 axes at 450° F. for 12 minutes followed by 5 minutes of air cooling and 1 minute of water spray cooling. After cooling the tanks were cut open around the middle and the lining examined. Some of the lining was removed from the tank and stored overnight in 190° F. water and the % Gel measured according to ASTM D2765. The results are given in Table 4.

TABLE 4

| ID | Sample | Overall Catalyst Level | Molding Surface Finish | Comments | % Gel |
|---|---|---|---|---|---|
| 4A | 100% EVS Polymer | 0 | smooth | good adhesion | 0% |
| 4B | 95% EVS Polymer 5% LDPE containing dibutyl-tindilaurate | 500 ppm DBTDL | rough | disbonded | 74.5% |
| 4C | 95% EVS Polymer 5% LDPE containing stearic anhydride | 0.375 wt % stearic anhydride | smooth | disbonded, waxy bloom | 70% |
| 4D | 95% EVS Polymer 5% LDPE containing benzoic anhydride | 1 wt % benzoic anhydride | smooth | disbonded, strong odor | 65% |
| 4E | 95% EVS Polymer 5% LDPE containing benzoic anhydride | 0.5 wt % benzoic anhydride | smooth | disbonded, strong odor | 62% |
| 4F | 95% EVS Polymer 5% LDPE containing lactide | 1 wt % lactide | smooth | good adhesion | 50% |

Rotomolded linings 4A and 4F exhibited excellent adhesion to the metal even after cutting the tanks open no disbonding occurred along the cut edge. The other linings all started to disbond from the metal within minutes of cooling and before cutting the tanks open. Lining 4B was very rough with many large gels.

Example 6

The following formulations were prepared on a Brabender Sigma Blade Mixer with a 500 g capacity bowl by blending at 130° C. @ 20 rpm for 5 minutes. The 4 MI EVS copolymer described in Example 1 was used.

| Sample | Formulation |
|---|---|
| 6A | 100% EVS Polymer |
| 6B | 99% EVS Polymer 1% Ascorbic Acid |
| 6C | 99% EVS Polymer 1% O-gluconolactone |
| 6D | 99% EVS Polymer 1% Lactide |

The compounds were pressed into 15 cm×15 cm×0.3 cm plaques using a picture frame mold in a heated press at 150° C. 5 tons pressure, for 2 minutes.

Example 7

The plaques from Example 6 were suspended in a humidity chamber at 70° C. and 95% R.H. and the % Gel formation measured over time using ASTM D2756. The results are given in Table 5.

TABLE 5

| Days in Sauna | % Gel 6A | % Gel 6B | % Gel 6C | % Gel 6D |
| --- | --- | --- | --- | --- |
| 18 days | 1% | 48% | 4% | 73% |
| 45 days | 4% | 67% | 8% | 80% |

Example 8

The formulations shown below in Table 6 were rotomolded in new, unused 4 liter paint cans by first tumble blending catalsyt with the 4 MI EVS polymer used in Example 1 ground to less than 35 mesh, s is typical for rotomolding grades of polymer resins. The catalyst powders were mixed directly with the EVS polymer powder. The EVS Polymer/Catalyst mixture in the paint can was loaded onto a chuck attached to an electric motor and rotomolded around one axis parallel to the sides of the can in an oven at 10 rpm, 265° C. for 10 minutes. The results of this rotomolding are given in Table 6.

TABLE 6

| ID | Sample | Surface Finish | Comments |
| --- | --- | --- | --- |
| 8A | 99% EVS Polymer 1% anhydrous citric acid | very rough | disbonded |
| 8B | 99% EVS Polymer 1% cyclohexyl dicarboxylic anhydride | smooth | disbonded |
| 8C | 99% EVS Polymer 1% succinic anhydride | smooth | disbonded, strong odor |
| 8D | 99% EVS Polymer 1% D,L-lactide | smooth | good adhesion |
| 8E | 99% EVS Polymer 1% ascorbic acid | brown, cellular | decomposed, good adhesion |
| 8F | 99% EVS Polymer 1% O-gluconolactone | brown, cellular | decomposed, good adhesion |
| 8G | 99% EVS Polymer 1% hydrophthalic anhydride lactide | smooth | disbonded |
| 8H | 100% EVS Polymer | smooth | good adhesion |

In this table "disbonded" means that the polymer lining the sides of the can separated from the metal surface so that an air space was evident within minutes to several hours after the molding had cooled to room temperature. Good adhesion means that the lining and metal remained in intimate contact indefinitely. The cellular nature of samples 8E and 8F were due to gas evolution due to catalyst decomposition.

Example 9

The rotomolded paint cans with polymeric linings were filled with water and stored in a 70° C. oven to simulate, for example, a hot water tank heater tank, and the % Gels measured over time. The results are given in Table 7.

TABLE 7

| Sample | Paint Can Full of $H_2O$ Days in 70° C. Oven | % Gel |
| --- | --- | --- |
| 8B | 7 Days | 75% |
| 8C | 7 Days | 70% |
| 8D | 7 Days | 69% |
| 8E | 7 Days | 67% |
| 8F | 7 Days | 70% |
| 8G | 7 Days | 74% |
| 8H | 7 days | 30% |

The rotomolded linings containing catalyst are crosslinked.

While the invention has been described in detail and with reference to specific embodiments thereof, it will be apparent to one skilled in the art that various changes and modifications can be made therein without departing from the spirit and scope thereof.

I claim:

1. A cross-linkable polymer composition containing a cross-linkable polymer having at least one hydrolysable silane group and at least one silanol condensation catalyst wherein said silanol condensation catalyst is a compound having a carboxylic acid precursor lactone moiety.

2. A composition as defined in claim 1 wherein said catalyst compound is a mono lactone.

3. A composition as defined in claim 2 wherein said lactone is selected from a gamma-lactone or a delta-lactone.

4. A composition as defined in claim 1 wherein said catalyst is a dilactone.

5. A composition as defined in claim 4 wherein said dilactone is a compound of the general formula.

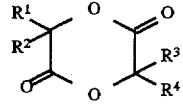

wherein $R^1$, $R^2$, $R^3$ and $R^4$ are selected from H or a $C_1$–$C_4$ alkyl group.

6. A composition as defined in claim 5, wherein said alkyl group is methyl.

7. A composition as defined in claim 6, wherein $R^1=R^3=H$, and $R^2=R^4=CH_3$.

8. A composition as defined in claim 5 wherein $R^1=R^2=R^3=R^4=H$.

9. A composition as defined in claim 1 wherein said lactone silanol condensation catalyst further comprises at least one hydroxyl group.

10. A composition as defined in claim 9 wherein said catalyst is a glyconolactone.

11. A composition as defined in claim 10 wherein said catalyst compound is delta-gluconolactone.

12. A composition as defined in claim 9 wherein said catalyst compound is ascorbic acid.

13. A composition as defined in claim 1 further comprising a conventional silanol condensation catalyst selected amongst carboxylic acid salts of the metals tin, zinc, iron, lead or cobalt; organic bases; inorganic acids; or organic acids.

14. A composition as defined in claim 1 wherein said silanol condensation catalyst constitutes about 0.1–3.0% $^w$/w of said composition.

15. A composition as defined in claim 1 wherein said cross-linkable polymer is a silane grafted homopolymer or copolymer, or a copolymer of an olefin and a silane.

16. A composition as defined in claim 15 wherein said composition comprises 100 parts by weight of a copolymer prepared by radically polymerizing a polymerizable monomeric mixture consisting essentially of ethylene and at least one ethylenically unsaturated silane compound selected from the group consisting of vinyltrimethoxysilane, vinyltriethoxysilane and methacryloxypropyltrimethoxysilane under a pressure ranging from 1000 to 4000 kg/cm$^2$, and containing said silane compound in an amount of from 0.5 to 2 wt. %; from 0.001 to 10 parts by weight of said silanol condensation catalyst.

17. A composition as defined claim 16 wherein said ethylenically unsaturated silane compound is vinyltrimethoxysilane.

18. A process for producing a cross-linked polymer comprising subjecting a composition as defined in claim 1 to an effective amount of heat and/or moisture to effect cross-linking.

19. A process for lining inner surfaces of containers with a polymer coating comprising charging an inner surface of a container with a composition as defined in claim 1, rotating said article around a variety of axes at a temperature to melt said composition to effect lining of the container with a polymer coating free of premature cross-linking characterized as "scorch".

20. A process for producing a cross-linked polymer which comprises first molding and then extruding or forming the composition as defined in claim 2 produce an article free of premature cross-linking and with improved adhesion.

21. A polymeric coating of cross-linked polymer having a gel-free, smooth surface finish as made by the process of claim 19.

22. A coated article comprising a container having inner surfaces coated with a cross-linked polymer as defined in claim 21.

23. A container coated with a lining of cross-linked polymer as defined in claim 22 wherein the container is a surface of a metal vessel.

* * * * *